(12) United States Patent
Hershey et al.

(10) Patent No.: US 7,148,581 B2
(45) Date of Patent: Dec. 12, 2006

(54) RAIL BASED ELECTRIC POWER GENERATION SYSTEM

(75) Inventors: John Erik Hershey, Ballston Lake, NY (US); Kenneth Brakeley Welles, II, Scotia, NY (US); Charles Erklin Seeley, Niskayuna, NY (US); David Michael Davenport, Niskayuna, NY (US); Harold Woodruff Tomlinson, Jr., Scotia, NY (US); Thomas Paul Feist, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 81 days.

(21) Appl. No.: 11/005,175

(22) Filed: Dec. 6, 2004

(65) Prior Publication Data

US 2006/0119102 A1    Jun. 8, 2006

(51) Int. Cl.
*H02K 35/00* (2006.01)
*F04B 17/00* (2006.01)
*F03G 7/00* (2006.01)

(52) U.S. Cl. .................... 290/1 R; 290/45; 290/3; 404/71; 60/325

(58) Field of Classification Search .............. 290/1 R, 290/3, 45; 404/71; 60/325
See application file for complete search history.

(56) References Cited

U.S. PATENT DOCUMENTS

| | | | |
|---|---|---|---|
| 617,246 A | 1/1899 | Gebhart | |
| 4,004,422 A | 1/1977 | Le Van | 60/533 |
| 4,130,064 A * | 12/1978 | Bridwell | 104/154 |
| 4,173,431 A | 11/1979 | Smith | 417/229 |
| 4,211,078 A | 7/1980 | Bass | 185/27 |
| 4,212,598 A * | 7/1980 | Roche et al. | 417/229 |
| 4,238,687 A | 12/1980 | Martinez | 290/1 R |
| 4,239,974 A * | 12/1980 | Swander et al. | 290/1 R |
| 4,402,524 A * | 9/1983 | D'Antonio et al. | 280/612 |
| 4,418,542 A * | 12/1983 | Ferrell | 60/668 |
| 4,700,540 A * | 10/1987 | Byrum | 60/325 |
| 5,347,186 A * | 9/1994 | Konotchick | 310/17 |
| 5,570,286 A * | 10/1996 | Margolis et al. | 701/36 |
| 5,634,774 A | 6/1997 | Angel et al. | 417/229 |
| 5,838,138 A * | 11/1998 | Henty | 320/107 |
| 6,127,812 A | 10/2000 | Ghezzo et al. | 320/166 |
| 6,172,426 B1 * | 1/2001 | Galich | 290/1 R |
| 6,204,568 B1 | 3/2001 | Runner | 290/1 R |
| 6,362,534 B1 * | 3/2002 | Kaufman | 290/1 R |
| 6,376,925 B1 * | 4/2002 | Galich | 290/1 R |
| 6,756,694 B1 * | 6/2004 | Ricketts | 290/1 R |
| 6,767,161 B1 * | 7/2004 | Calvo et al. | 404/71 |
| 6,858,952 B1 * | 2/2005 | Gott et al. | 290/1 R |
| 6,936,932 B1 * | 8/2005 | Kenney | 290/1 R |
| 6,949,840 B1 * | 9/2005 | Ricketts | 290/1 R |
| 6,969,213 B1 * | 11/2005 | Rastegar et al. | 404/11 |
| 2004/0130158 A1 | 7/2004 | Kenney | 290/1 R |

* cited by examiner

*Primary Examiner*—Nicholas Ponomarenko
(74) *Attorney, Agent, or Firm*—Fletcher Yoder

(57) ABSTRACT

An electrical power generation system comprises a variable capacitor and a power source. The electrical power generation system is configured to generate electric power via movements of the rail. The power source is used in the form of a generator to prime the variable capacitor that effectively multiplies the priming energy of the power source by extracting energy from the passing vehicle. By alternately priming the variable capacitor using charge from the power source and discharging it at a later time in a cyclic manner to change the capacitance, a significantly large amount of electrical energy is produced due to change in capacitance than from the power source itself.

34 Claims, 6 Drawing Sheets

RAIL BASED ELECTRIC POWER GENERATION SYSTEM

BACKGROUND

The present technique relates generally to rail based devices and, more specifically, to an energy co-generation device for generating electric power in response to vehicular traffic on a rail.

Traditionally, operation data related to railroad traffic and railroad assets is gathered at manned junctions, such as a rail yard or a rail depot. By way of example, railroad workers often inspect rails for damage and loading conditions. As yet another example, railroad workers often inspect and inventory the incoming and outgoing railcars, to manage and facilitate the flow of traffic on a railroad network. However, railroad networks often span thousands of miles and traverse through sparsely populated and remote regions.

Unfortunately, traditional automated devices generally obtain operating power from an external power source, which is not generally available in remote areas. That is, the automated device receives operating power that is generated at a remote location and that is delivered over a power grid, and coupling the grid to the device can be a costly proposition, especially in remote areas. In certain instance, local power sources, such as batteries, have been employed. In any event, even if a local or external power source is provided, these power sources may not provide a cost effective mechanism for producing sufficient levels of power for operation of the automated testing devices.

Therefore, there is need for a system and method for improving electric power generation with respect to rail systems.

BRIEF DESCRIPTION

In accordance with one exemplary embodiment, the present technique provides an electric power co-generation system for use with a railroad network. The system includes a power source, such as a power generation device or an external power source. The power co-generation system includes first and second electrical capacitance portions that are electrically coupled to the power source and that are configured to carry positive and negative charges, respectively. The power co-generation system further includes a biasing device that is configured to separate the first and second capacitance portions with respect to one another. Thus, by varying the distance between the capacitance portions in response to a vehicle on the rail, the capacitance portions cooperate to act as a variable capacitor that facilitates the co-generation of power with respect to the system. That is to say, the mechanical energy of the biasing device is converted into electrical energy for the system.

In accordance with another exemplary aspect of the present technique, a method of co-generating power via a vehicle traveling on a rail is provided. The method includes the act of driving first and second capacitor plates with respect to one another in response to the vehicle that is traveling on the rail. The method also includes the act of charging the first and second capacitor plates via a power source, such as a power generation device or an external power source. The method further includes biasing the first and second plates apart from one another, thereby displacing the plates with respect to one another. This displacement changes the electrical capacitance between the first and second plates and, resultantly, increases the electric potential between the first and second plates. In turn, this displacement of the first and second plates facilitates the co-generation of electrical energy from the kinetic and potential energy of the vehicle on the rail.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As a preliminary matter, the definition of the term "or" for the purposes of the following discussion and the appended claims is intended to be an inclusive "or." That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "'A' or 'B'" includes: "A" by itself, "B" by itself, and any combination thereof, such as "AB" and/or "BA."

Figure 1:
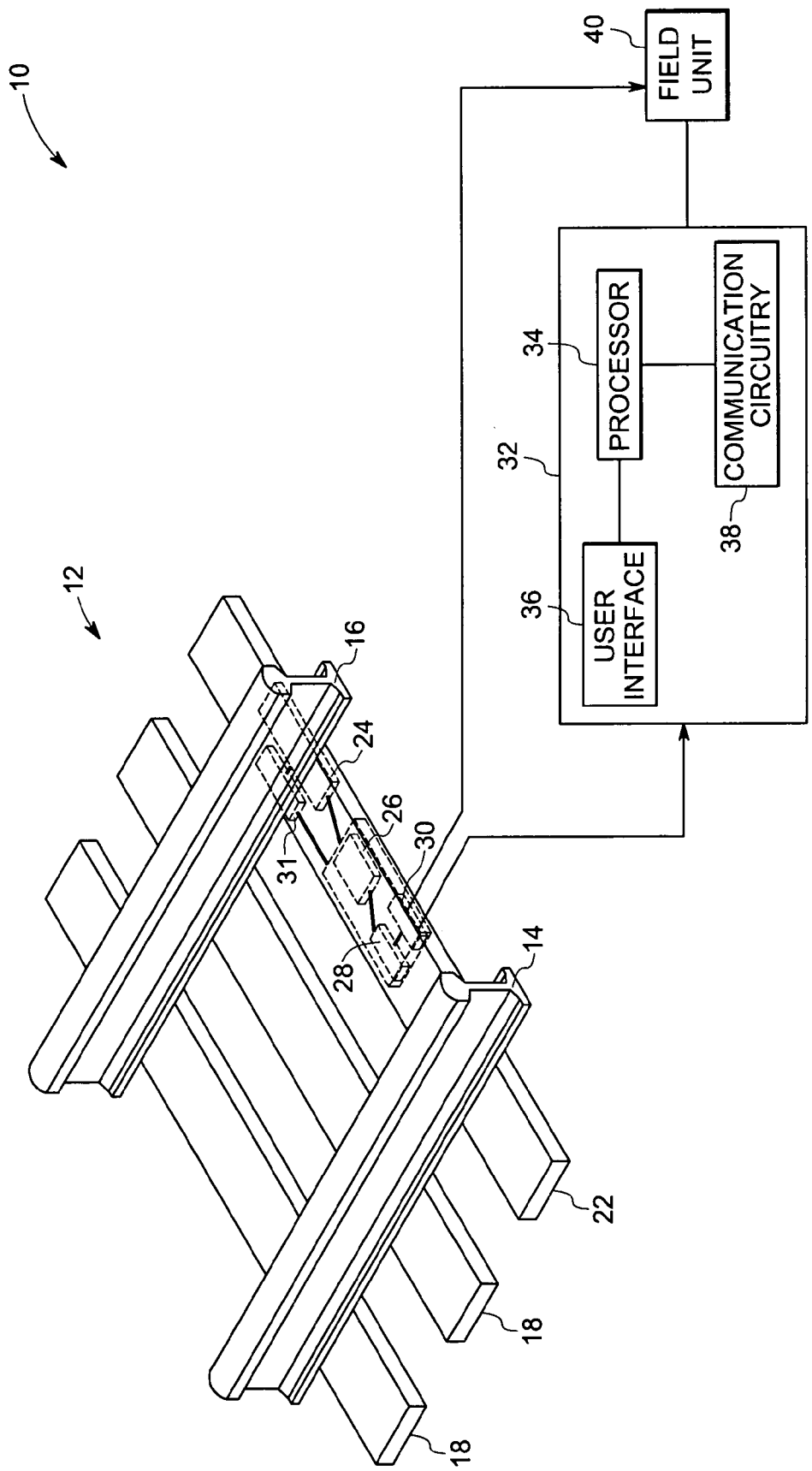
FIG. 1 is a diagrammatical representation of a railway monitoring system, in accordance with an exemplary embodiment of the present technique.

FIG. 1 illustrates an exemplary railway monitoring system 10. In the illustrated embodiment, the railway monitoring system 10 includes a railway track 12 that has a left rail 14, a right rail 16 and a plurality of ties 18 extending between and generally transverse to these rails 14, 16. The ties 18 are coupled to the rails 14, 16 and provide lateral support to the rails 14, 16, which are configured to carry vehicles, such as trains, trams, testing vehicles or the like. Advantageously, the system 10 also includes a power tie 22 that has hollowed regions that provide locations inside of which various components are disposed, as discussed further below. Although the illustrated embodiment shows a single power tie 22, railroad networks including any number of power ties 22 and power ties 22 in electrical communication with one another are envisaged. Advantageously, communication between the power ties 22 facilitates sharing of resources and also facilitates the development of certain data types, such as block occupancy detection, distance to train, detection of broken rail, or the like. As discussed further below, the power tie 22 is used to power sensors, signaling devices or any number of suitable electrical devices.

The power tie 22 includes a power source, such as the illustrated power generation device 24, a sensing device 26, a processor 28, and communication circuitry 30, all of which are disposed within the hollowed regions of the power tie 22. With respect to the power generation device 24, it is worth noting that exemplary power generation device 24 envisages external power sources, a host of local power generation device or a combination thereof, among other types of power devices. A power co-generation device 31, as discussed below, cooperates with the power source (e.g. power generation device 24) to generate power. By disposing these components in the power tie 22, the power tie 22 acts as a housing that protects and facilitates the installation of various components of the tie 22. However, in alternate embodiments, the various components can be disposed in individual housings that are independent of the power tie or ties 22. Additionally, in some embodiments, the power tie 22 includes conditioning circuitry that is configured to rectify and/or convert the power output from the power generation device 24 to a desired output power that is appropriate to the electrical components located downstream of the power generation device 24. The sensing device 26 is coupled to the processor 28, which includes hardware circuitry and/or software that facilitates the processing of signals from the sensing device 26. As will be appreciated by those skilled in the art, the processor 28 includes a range of circuitry types, such as a microprocessor, a programmable logic controller, a logic module, etc. Additionally, those of ordinary skill in the art will appreciate that the sensing device 26 encompasses any number of devices including weight sensors, temperature sensors, or the like.

In the railway monitoring system 10, the communication circuitry 30 is configured to receive data signals output from the processor 28 and/or the sensing device and to transmit the data signals to a remote monitoring center 32. The communication circuitry 30 comprises hardware and/or software that facilitates the communication circuitry 30 to communicate the data signals to the remote monitoring center 32. In some embodiments, the communication circuitry 30 is configured to communicate the data signals to the remote monitoring center 32 in accordance with a given communication protocol, such as a cellular protocol, a wireless protocol, a radio frequency protocol, or a combination thereof. Of course, those of ordinary skill in the art will appreciate that any number of suitable communication protocols can be employed. Additionally, the communication circuitry 30 is also configured to receive information from a remote location, such as the remote monitoring center 32.

In the exemplary railroad network, the remote monitoring center 32 includes a processor 34, user interface 36, and communication circuitry 38. To facilitate communications with field technicians, the remote monitoring center 32 and the power tie 22 are configured to communicate with a field unit 40, which, by way of example, is a laptop computer. Again, the communication circuitry 30 receives data signals output from the processor 28 or the sensing device 26 and transmits these data signals to the field unit 40 via a wired connection port or a short range wireless link such as infrared protocol, Bluetooth protocol, 802.11 wireless local area network or the like.

To communicate with the power tie 22, the remote monitoring center 32, as well as the field unit 40, each includes communication circuitry 30 and user interfaces 36. Advantageously, the user interfaces 36 facilitate inputs from a user and provides mechanism through which a user can manipulate data and sensed properties from the components of the power tie 22. As will be appreciated by those skilled in the art, the user interface may include a command line interface, menu driven interface, keyboard, graphical user interface, among other types of suitable user interface.

Figure 2:
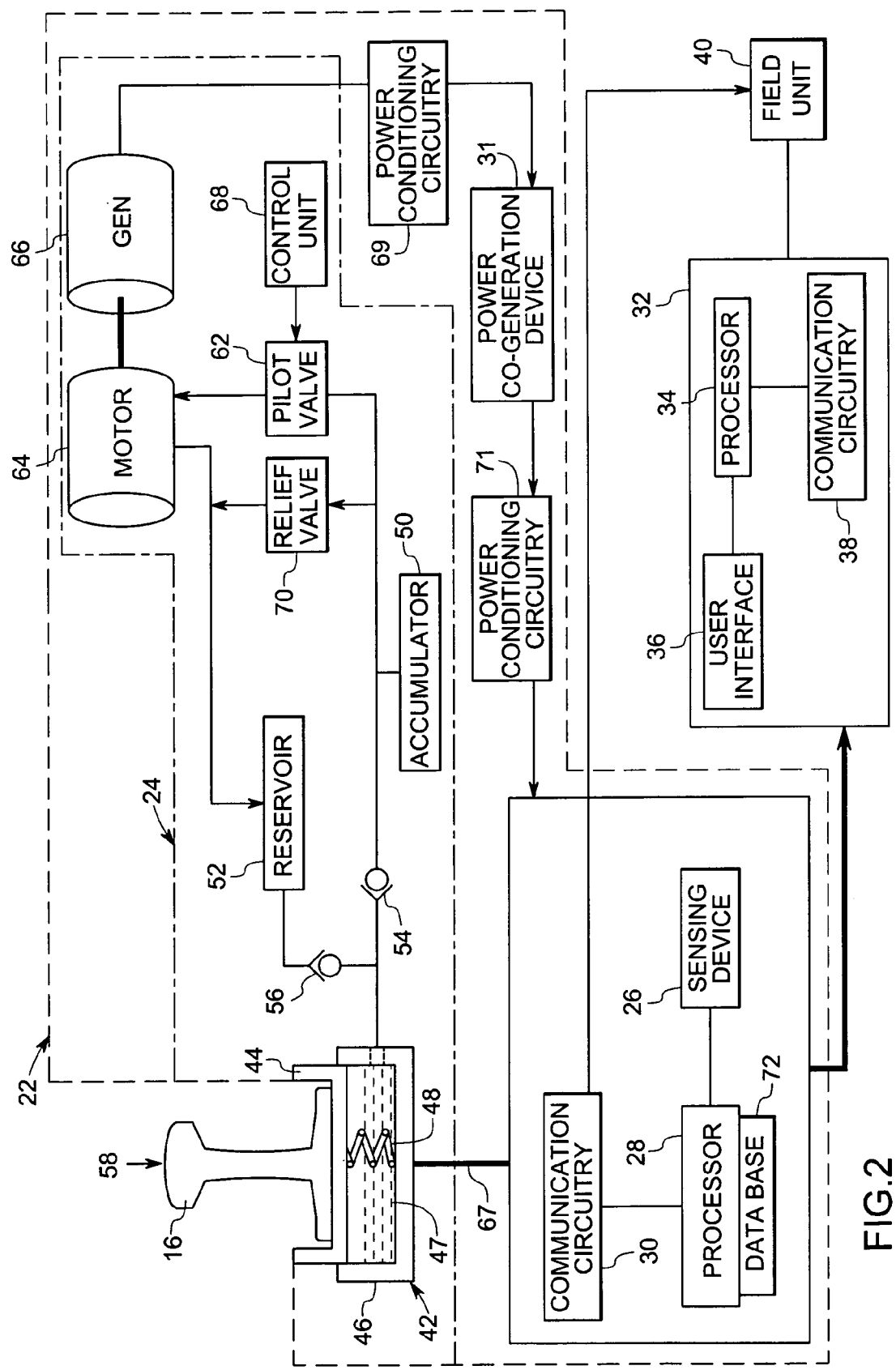
FIG. 2 is a diagrammatical representation of a railway monitoring system employing a hydraulic power scavenging unit as a power generation device, in accordance with an exemplary embodiment of the present technique.

Referring generally to FIG. 2, exemplary components of a power tie 22 and a railway monitoring system 10 are diagrammatically illustrated. The power tie 22 includes the power generation device 24 that is configured to convert the kinetic and potential energy of the vehicle passing on the rail into electrical energy for the system. As one example, the power generation device 24 includes a hydraulic power scavenging unit 42. The hydraulic power scavenging unit 42 includes a piston 44 disposed inside a hydraulic cylinder 46 that is filled with a fluid 47, such as air or a suitable liquid. The piston 44 actuates downwardly (arrow 58) in response to a vehicle traveling along the railway track. That is to say, in the illustrated embodiment, the weight of a vehicle on the rail 16 downwardly drives the rail 16 to which the piston 44 is mechanically connected. However, the piston 44 is biased towards the vehicle (i.e., upwardly) traveling along the railway track by a biasing member 48, such as a coiled compression spring. Thus, when the weight of the train is removed, for instance, the piston 44 actuates upwardly to its normal position.

In the power scavenging unit 42, the hydraulic cylinder 46 is fluidically coupled to the accumulator 50 and a fluid reservoir 52. To facilitate the unidirectional circulation of fluid, the pathways between the cylinder 46, the accumulator 50 and the reservoir 52 includes check valves 54 and 56. By way of example, the check valves 54, 56 are biased ball valves, which are appreciated by those of ordinary skill in the art.

When a vehicle passes along the railway track in proximity to the power tie 22, the weight of the vehicle drives the rail 16 downwardly, as represented by directional arrow 58. This motion of the rail, in turn, causes the piston 44 to move downward inside the cylinder 46. As a result, hydraulic fluid 47 is forced from the hydraulic cylinder 46 to the accumulator 50. As the hydraulic fluid is forced from the cylinder 46, the fluid 47 forces the check valve 54 open and flows into the accumulator 50. By way of example, the hydraulic fluid 47 is stored inside the accumulator 50 at a pressure in the range of 2000 to 5000 pounds per square inch (psi).

As the vehicle passes the portion of the rail 16 above the piston 44, the weight of the vehicle is removed and the compression spring 48 biases the piston 44 upwardly, facilitating the flow of replenishing hydraulic fluid 47 from the reservoir 52 to the cylinder 46, thereby providing a steady state of fluid 47 to the cylinder 46. As each vehicle traverses over this rail 16, more and more fluid is pumped into the accumulator 50, increasing the pressure inside the accumulator 50.

When the pressure of the fluid 47 inside the accumulator 50 reaches a set pressure, a pilot valve 62 releases the pressurized hydraulic fluid 47 from the accumulator 50, and the released fluid 47 is routed to a motor 64 and generator 66 assembly. As one example, a control unit 68 directs the pilot valve 62, which, in turn, controls the flow of the hydraulic fluid 47 from the accumulator 50. Advantageously, the hydraulic power scavenging system 42 includes a relief valve 70 that relieves excess pressures from the accumulator 50. That is, if the pressures in the accumulator 50 exceed operating parameters, the relief valve 70 opens to release some of the hydraulic fluid 47, reducing the likelihood of damage due to over-pressurization of the system. In the exemplary system, the relief valve 70 manages a conduit that directly links the accumulator 50 and the reservoir 52, and that bypasses the motor 64 and generator 66.

When the preset limit of the pilot valve 62 is reached (i.e., the accumulator 50 has reached a certain fluid pressure), the pressurized hydraulic fluid flows from the accumulator 50 to the motor 64 and generator assembly 66. In the exemplary system, this assembly receives the circulating hydraulic fluid, which causes at least one rotor within this assembly to rotate. The generator 66 then converts this mechanical rotation (i.e., torque) into an electrical power. By way of example, the generator 66 includes a permanent magnet rotor circumscribed by stator windings. Thus, as the permanent magnet rotor rotates, an electrical current is induced in the stator winding, and, as such power is produced. Of course, those of ordinary skill in the art will appreciate that any number of generator constructions are envisaged. The circulation of the fluid 47 continues, as hydraulic fluid 47 from the motor 64 and generator assembly 66 is expelled into the reservoir 52.

In the illustrated embodiment, the generator 66 is coupled to the sensing device 26, the processor 28 and the communication circuitry 30, which receive operating power from the generator 66. The exemplary embodiment includes one power conditioning circuitry 69, the power co-generation device 31, and another power conditioning circuitry 71 disposed electrically between the downstream operating components (e.g., processor 28 and the generator 66). The power co-generation device 31, as discussed further below, employs changes in capacitance to increase electrical energy within the system. The power conditioning circuitry 69 receives input power from the generator 66 and conditions the received power to a desired output level appropriate for the power co-generation device 31. The power conditioning circuitry 71 receives input power from the power co-generation device 31 and conditions the received power to a desired output level appropriate for the various components of the system. For example, the conditioning circuitry 71 may alter the voltage of the input power and/or convert the output power between alternating current (AC) and direct current (DC) power. Advantageously, the generator 66 provides operating power to any number of components that are disposed within or external to the power tie 22 and this power may be at any number of suitable levels and types.

In the illustrated embodiment, an analog signal line 67 between the hydraulic cylinder 46 and the sensing device 26 carries an analog signal indicative of the load on the rail 16. The sensing device may be a pressure transducer, displacement sensor, or the like. The processor 28 also includes a database 72 configured to store predefined information about vehicles traveling on the rail. Furthermore, the database 72 is configured to store information from the processor 28 or the sensing device 26, among other types of data.

Figure 3:
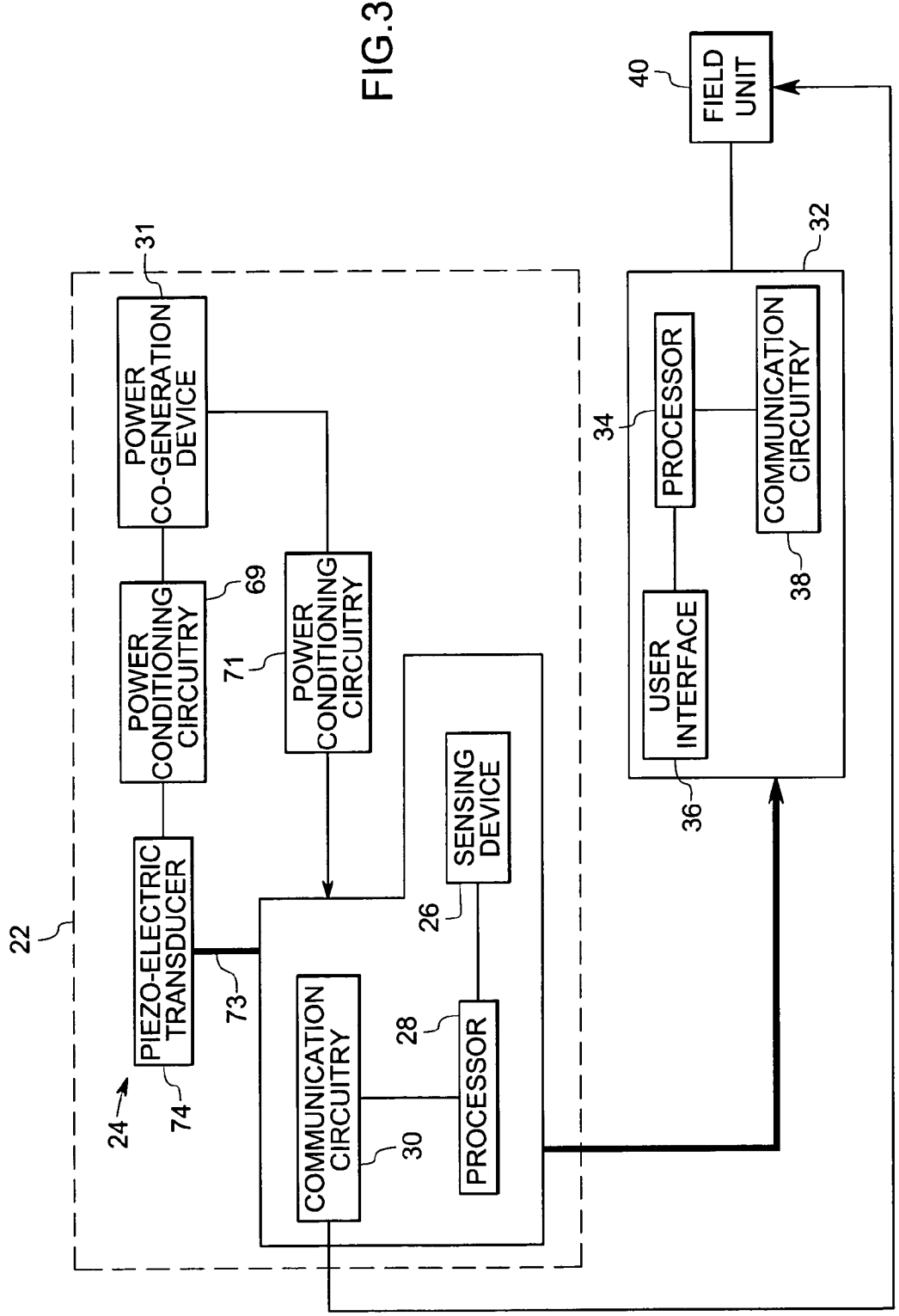
FIG. 3 is a diagrammatical representation of a railway monitoring system using a piezo-electric transducer as a power generation device, in accordance with an exemplary embodiment of the present technique.

FIG. 3 illustrates an alternative embodiment of the power generation device 24 of the railway monitoring system. In this illustrated embodiment, the power generation device 24 includes a piezo-electric transducer 74. The exemplary piezo-electric transducer 74 includes thin polymer films, ceramics, single crystal materials as well as other piezoelectric element structures. The piezo-electric transducer 74 converts mechanical energy into electrical energy, as is appreciated by those of ordinary skilled in the art. For the piezo-electric transducer 74, the input excitation is a mechanical displacement of the rail (e.g., vibration, flexing) as a vehicle passes over the coupled section of rail. As is appreciated by those of ordinary skill in the art, piezo-electric materials deform due to the application of a physical force, and the mechanical energy of this deformation is converted into electrical energy. Accordingly, the mechanical displacement of the rail caused by a passing vehicle is harnessed to physically deform the piezo-electric transducer 74, and, resultantly, electrical energy is produced in response to the passing vehicle. This resultant electrical energy is then harnessed to provide operating power to any number of components both within and external to the power tie 22.

In the illustrated embodiment, the piezo-electric transducer 74 is coupled to the sensing device 26, the processor 28 and the communication circuitry 30, which receive operating power from the piezo-electric transducer 74. The exemplary embodiment includes the power co-generation device 31 and the power conditioning circuitries 69, 71 disposed electrically between the downstream operating components (e.g., processor 28 and the piezo-electric transducer 74). The power co-generation device 31, as discussed previously, employs changes in capacitance to increase electrical energy within the system. The power conditioning circuitry 69 receives input power from the piezo-electric transducer 74 and conditions the received power to a desired output level appropriate for the power co-generation device 31. The power conditioning circuitry 71 receives input power from the power co-generation device 31 and conditions the received power to a desired output level appropriate for the various components of the system. An analog signal line 73 between the piezo-electric transducer 74 and the sensing device 26 carries an analog signal indicative of the load on the rails.

However, it is worth noting that the foregoing power generation devices 24 are merely examples of power generation devices. Indeed, as discussed above, other types of power generation devices are envisaged. For example, solar power generation devices as well as hydroelectric, and wind powered power generation devices are envisaged. Additionally, it is worth noting that the present technique affords benefits to local power sources, such as batteries, as well as to external power sources, and should not be limited to use with power generation devices.

Figure 4:
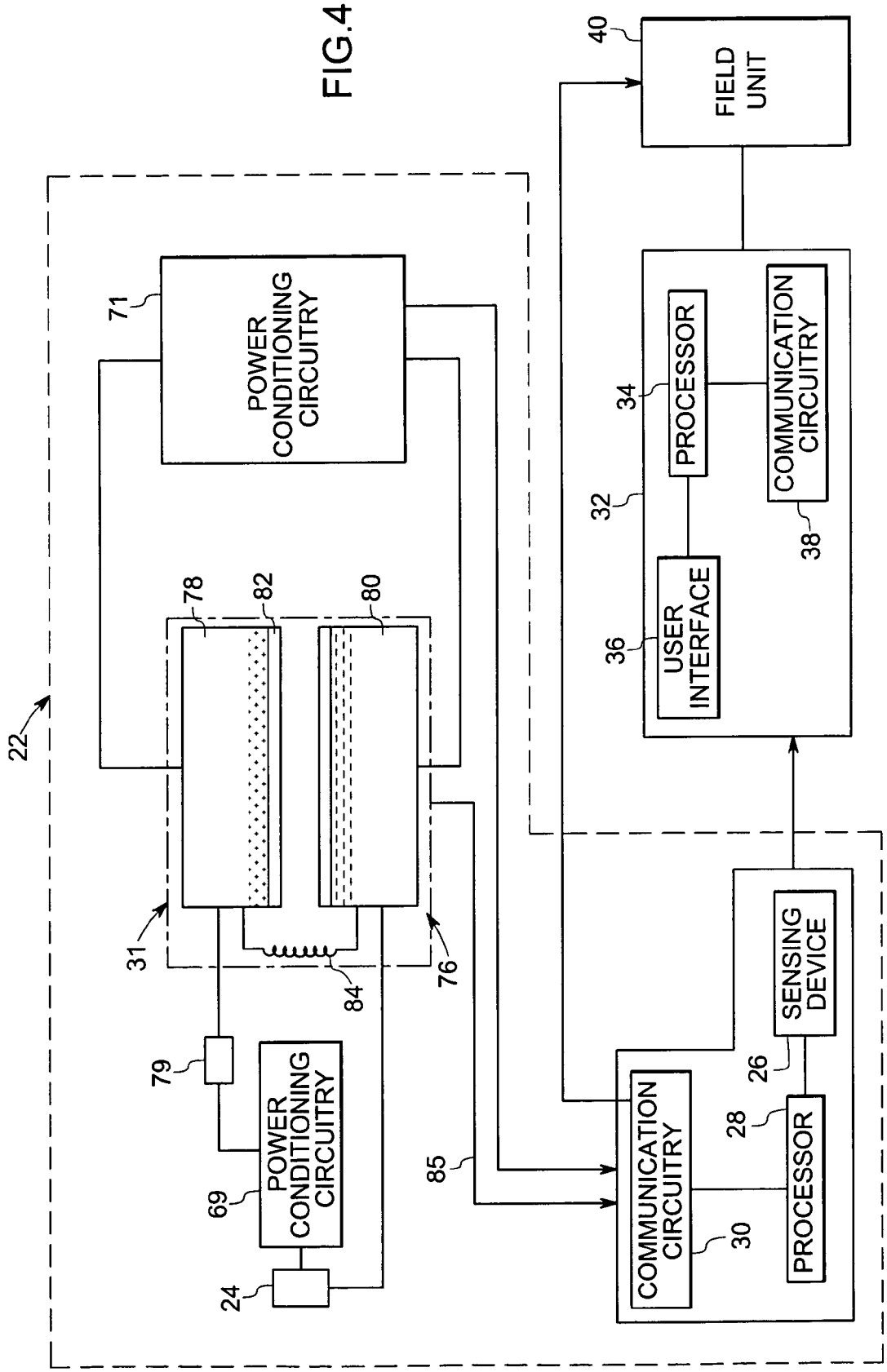
FIG. 4 is a diagrammatical representation of a railway monitoring system having a power co-generation device, in accordance with an exemplary embodiment of the present technique.

FIG. 4 illustrates an exemplary railway monitoring system. In the exemplary embodiment, the power co-generation device 31 includes a variable capacitor 76. The variable capacitor 76 has two capacitance portions, such as conductive plates 78 and 80 that are each coated with a thin film of dielectric material 82. The two electrically conductive plates 78, 80 are held mutually apart in an open position via a biasing member, such as a compression spring 84. The plates 78, 80 are electrically coupled to the power source 24, such as the illustrated power generation device, and each plate carries opposite charges with respect to one another. The variable capacitor 76, as discussed further below, facilitates changes in the distance between the two plates 78, 80, causing electrical power generation from this changing distance.

To facilitate electrical isolation of the two capacitance plates 78, 80, a dielectric film 82 is provided on one plate or on both of the plates 78, 80. The dielectric film 82 acts as an insulator between the conductive plates 78, 80 and impedes the flow of current between the capacitor plates 78, 80. In one exemplary embodiment, the dielectric film 82 includes polyimide material, such as a kapton having functionally linked polymers. In another embodiment, the dielectric film includes aluminum oxide having polar metal oxide bonds possessing large permanent dipole moment. In some other embodiments, the dielectric film may include, polymers, ceramics, or the like. Indeed any number of dielectric materials are envisaged.

In the illustrated embodiment, the power source 24 is coupled to the conductive plate 80. The power source may be located locally within the power tie 22 or external to the power tie. The power source 24 is coupled to the conductive plate 78 via the power conditioning circuitry 69 and a power isolation device 79. In one embodiment, the power isolation device 79 is a switch. In another embodiment, the power isolation device 79 is a diode.

When DC voltage is applied across the two plates 78, 80 of the variable capacitor 76, a concentrated field flux is created between the plates 78, 80, and electrons are liberated from the positive conducting plate and deposited on the negative conducting plate. Thus, one of the plates develops a positive charge, while the other plate develops a negative charge. The greater the difference of electrons on opposing plates of a capacitor, more flux is generated and the capacitor is able to store more electrical energy. Specifically, the voltage across the capacitor (i.e. between the plates) is increased. The capacitance of the capacitor is dependent on the area of the plates, distance between the plates, and ability of dielectric material to support electrostatic forces, as discussed further below. Because, each plate stores equal but mutually opposite charge, the total charge in the capacitor is zero. In the illustrated embodiment, an analog signal line 85 between the co-generation device 31 and the sensing device 26 carries an analog signal indicative of the load on the rails. The operation of the variable capacitor 76 is discussed in detail below.

Figure 5:
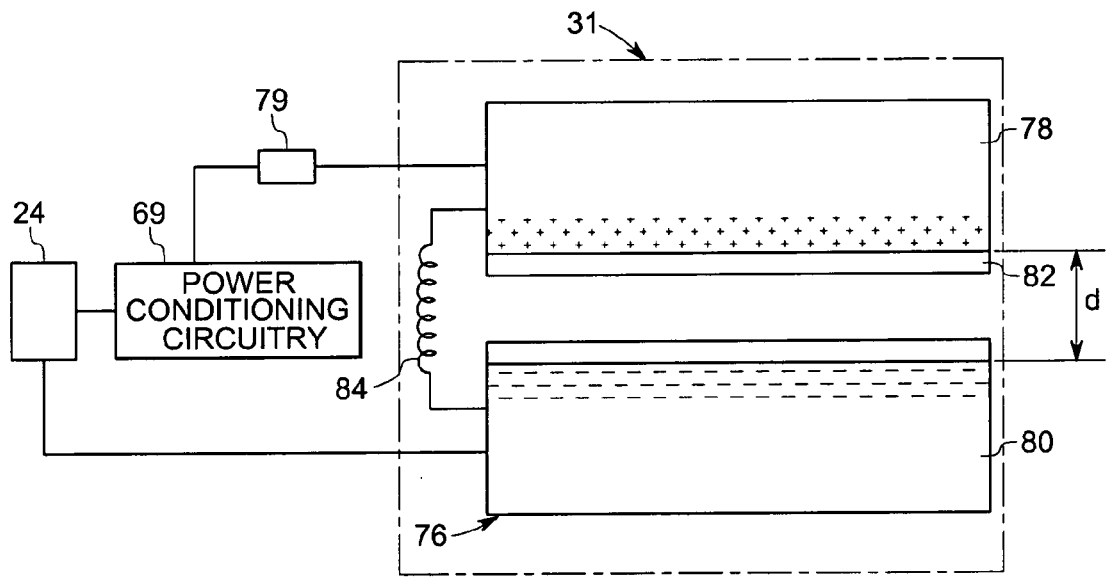
FIG. 5 is a diagrammatical view of an exemplary power co-generation device in an open position, in accordance with an exemplary embodiment of the present technique.

FIG. 5 illustrates an exemplary variable capacitor 76 in an open position. The plates are biased apart and held in this open position by a biasing member, such as a compression spring 84. The plates 78, 80 are separated by a larger gap "d" in the open position, and the open position corresponds to a situation when there is no vehicle above the rails. The capacitance of the capacitor 76 is directly proportional to the electrostatic force field between the plates 78, 80, and the capacitance of the capacitor 76 is calculated in accordance with the following relationship:

$$C = \frac{\varepsilon A}{d} \tag{1}$$

where C is the capacitance in farads, $\varepsilon$ is the permittivity of the dielectric, A is the area of the plate in square meters, and "d" is the distance between the plates in meters. From the above mentioned relationship, it can be seen that the capacitance of the capacitor 76 is reduced in the open position, because the capacitance is inversely proportional to the distance or gap "d" between the capacitor plates 78, 80.

Figure 6:
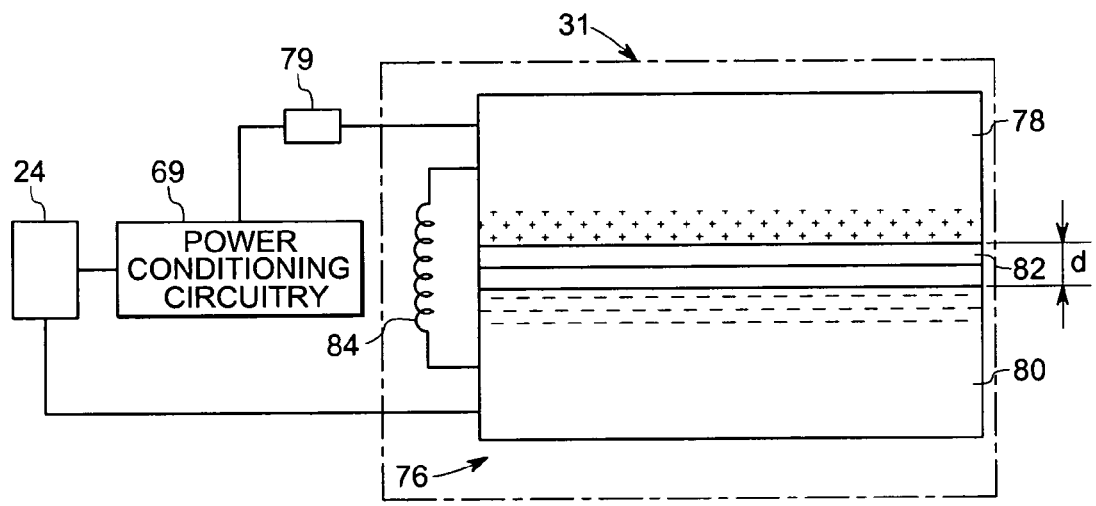
FIG. 6 is a diagrammatical view of the exemplary power co-generation device of FIG. 5 in a closed position.

FIG. 6 illustrates the exemplary variable capacitor 76 held in a closed position. When a vehicle is above the rails, the plates 78, 80 are biased towards each other, thus reducing the gap "d". This reduction in the gap "d" changes the distance between the plates 78, 80 and also changes the capacitance characteristics of the variable capacitor 76. From the above mentioned relationship (1), it can be seen that the capacitance of the capacitor 76 in the closed position is increased due to the reduced gap "d" between the capacitor plates 78, 80. Indeed, in the closed position, the value of "d" is effectively the thickness of the dielectric film 82, and this thickness is significantly smaller than the value of "d" in the open position.

Voltage across the plates in open position is calculated as:

$$V_o = \frac{C_c}{C_o} V_c \tag{2}$$

where $C_c$ is the capacitance in the closed position in farads, $C_o$ is the capacitance in open position in farads, $V_c$ is the voltage across the plates in closed position, and $V_o$ is the voltage across the plates in the open position.

In one example, dielectric permittivity k=2.5, $\epsilon_0$=8.55 picofarads/m, $\epsilon=k\epsilon_0$=2.2×10$^{-11}$ farads/m, A=0.1 m², t=1 micron (10$^{-6}$ m) is the thickness of the dielectric layer, d=1 mm (10$^{-3}$ m) is the space between the plates.

$$C_c = \frac{\varepsilon}{t} A = \frac{2.2 \times 10^{-11} \text{farads/m}}{10^{-6} \text{ m}} \times 0.1 \text{ m}^2 = 2.2 \times 10^{-6} \text{farads} = 2.2 \ \mu f;$$

Thus, when the exemplary variable capacitor 76 is in the closed position, the capacitor has a capacitance value of 2.2 microfarads, and the distance between the plates is defined by the thickness of the dielectric material. When the distance between the plates is increased, the capacitance of the variable capacitor 76 is changed to:

$$Co = \frac{\varepsilon_0}{d} A = \frac{8.55 \times 10^{-12}}{10^{-3}} \times 0.1 \cong 0.0009 \ \mu f;$$

where d>>t.

In this system, the electrical potential across the plates is inversely proportional to the capacitance of the device and is:

$$v_o = \frac{C_c}{C_o} \times V_c \cong 2400 \tag{3}$$

where Vo is the voltage or electric potential across the plates when the plates are in the open position and Vc is the electric potential across the plates when the plates are in the closed position. Increasing the electrical potential of the variable capacitor 76 also increases the electrical energy of the system, as the mechanical energy of separating the plates is converted into electrical energy. Thus, in the above example, the electrical energy of the capacitor 76 is increased by 2400 times.

The power generation device 24 effectively primes the variable capacitor 76, and the energy of this priming is multiplied by varying the distance between the capacitor plates 78, 80. By alternately priming the variable capacitor 76 using power from the power source 24 and discharging it at a later time in a cyclic manner to change the capacitance, a significantly large amount of electrical energy is produced due to change in capacitance in comparison to the electrical energy and power from the power source itself. In one embodiment, a number of such systems are connected together for greater energy delivery. In another embodiment, the plates 78, 80 of the capacitor 76 are immersed in a dielectric fluid to mitigate the likelihood of a sudden voltage breakdown. The power generated from the variable capacitor 76 is used to improve power to various components of the system, as discussed above.

Additionally, by monitoring various properties of the variable capacitor 76, certain properties regarding the vehicle passing on the rail can be determined. For example, determining the time, the capacitor 76 is in the closed position or the open position provides an indication of the speed of the vehicle.

Figure 7:
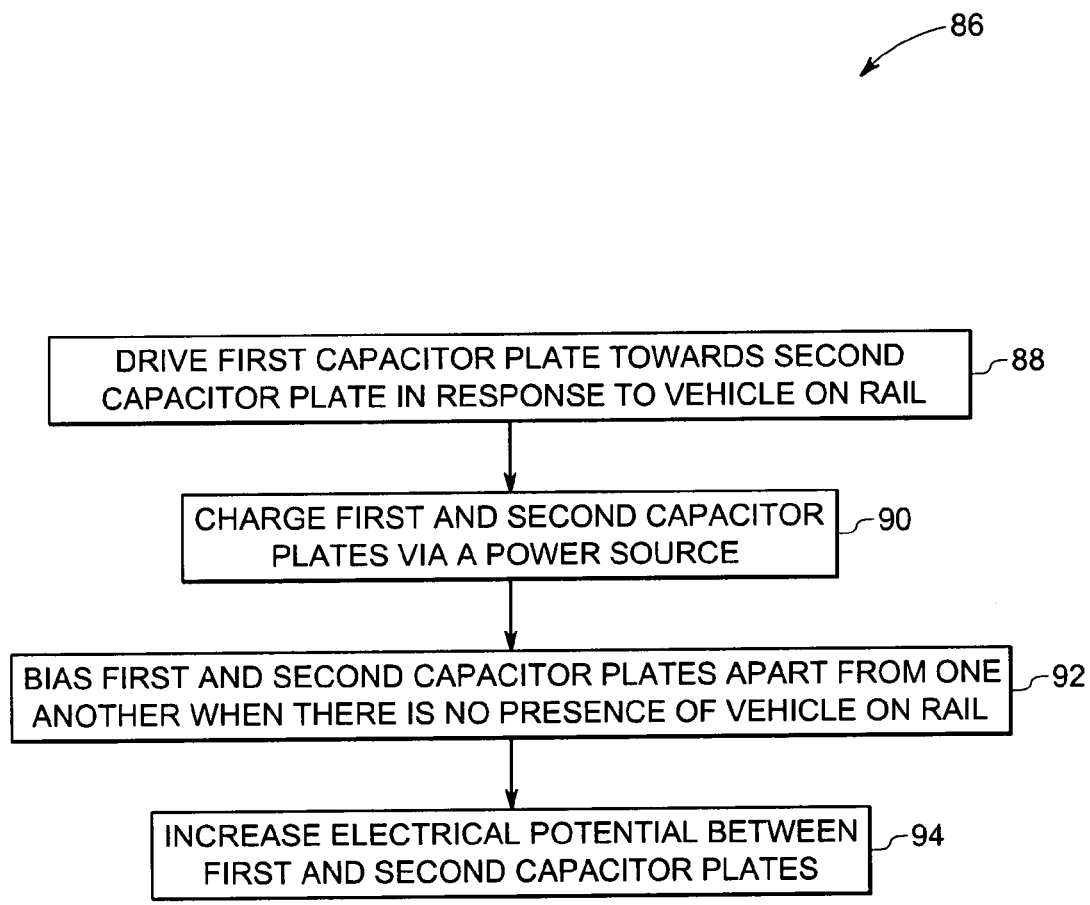
FIG. 7 is a flow chart illustrating a process of co-generating power, in accordance with an exemplary embodiment of the present technique.

FIG. 7 illustrates an exemplary method of co-generating power 86. The method 86 comprises driving the first capacitor plate 78 with respect to another capacitor plate 80 in response to a vehicle operating on the rail as represented by block 88. As a result, the gap "d" between the capacitor plates is reduced. This reduction in gap changes the distance between the plates and also changes the characteristic capacitance. The first and second capacitor plates are charged via a power source as represented by block 90. The first and second capacitor plates are biased apart from one another when there is no presence of vehicle on the rail as represented by block 92. The capacitor plates are held in the open position via a biasing member such as spring. The plates are separated by a larger gap in an open position. The capacitance of the capacitor is more in the open position than in the closed position. As a result, the electric potential between the first and second capacitor plates is increased as represented by block 94. The capacitor effectively multiplies the priming energy of the power source by extracting energy from the passing vehicle. By alternately priming the variable capacitor using the charge from the power source and discharging it at a later time in a cyclic manner to change the capacitance, a significantly large amount of electrical energy is produced due to change in capacitance than from the power source itself While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical power generation system for a railroad system having a rail, comprising:
   a power generation device;
   a first and second electrical capacitance portions that are electrically coupled to the power generation device and that are configured to store positive and negative charge respectively; and
   a biasing device configured to separate the first and second capacitance portions with respect to one another;
   wherein the first and second electrical capacitance portions are configured to move with respect to one another in response to a vehicle operating on the rail.

2. The electrical power generation system of claim 1, wherein the power generation device, first and second capacitance portions, and the biasing device are provided inside a hollow power tie installed between a pair of rails.

3. The electrical power generation system of claim 1, wherein the power generation device is configured to generate power in response to a vehicle operating on the rail.

4. The electrical power generation system of claim 3, wherein the power generation device comprises a fluidically actuated generator.

5. The electrical power generation system of claim 3, wherein the power generation device comprises a piezo-electric device.

6. The electrical power generation system of claim 1, wherein the power generation device comprises a solar device.

7. The electrical power generation system of claim 1, wherein the power generation device comprises a wind powered generator.

8. The electrical power generation system of claim 1, wherein the first and second electrical capacitance portions comprises capacitor plates.

9. The electrical power generation system of claim 8, wherein the biasing device comprises a compression spring.

10. The electrical power generation system of claim 1, wherein the first or second electrical capacitance portion has a dielectric material disposed on a surface thereof.

11. The electrical power generation system of claim 10, wherein the dielectric material comprises a polyimide dielectric film.

12. The electrical power generation system of claim 10, wherein the dielectric material comprises an aluminium oxide dielectric film.

13. The electrical power generation system of claim 1, further comprising a conditioning circuitry configured to condition an input power to a desired output power.

14. The electrical power generation system of claim 1, further comprising a sensing device configured to receive power from the first and second capacitance portions and sense a parameter of a vehicle traveling along the rail.

15. The electrical power generation system of claim 14, further comprising a processor configured to receive communications from the sensing device.

16. The electrical power generation system of claim 15, further comprising a communication circuitry that is coupled to the processor and configured to communicate with a remote location.

17. The electrical power generation system of claim 16, wherein the communication circuitry is configured to communicate with a field unit via a wireless or wired media.

18. An electrical power generation system for a railroad system having a rail, comprising:
   a power source; and
   a variable capacitor that comprises a first and second capacitor plates that are positionable at variable distances with respect to one another and that are electrically coupled to the power source, wherein the first and second capacitor plates are configured to move with respect to one another in response to a vehicle traveling on the rail.

19. The electrical power generation system of claim 18, wherein the power source comprises a battery.

20. The electrical power generation of system of claim 18, wherein the power source comprises a solar device.

21. The electrical power generation system of claim 18, wherein the power source comprises a wind powered generator.

22. The electrical power generation system of claim 18, wherein the power source comprises a piezo-electric generator.

23. The electrical power generation system of claim 18, wherein the power source comprises a fluidically actuated generator.

24. The electrical power generation system of claim 18, further comprising a biasing device configured to bias the first and second capacitor plates away from one another.

25. The electrical power generation system of claim 24, further comprising a dielectric material disposed on the first or second capacitor plate and configured to electrically isolate the first and second capacitor plates from one another.

26. The electrical power generation system of claim 25, wherein the dielectric material comprises a polyimide dielectric film.

27. The electrical power generation system of claim 25, wherein the dielectric material comprises an aluminium oxide dielectric film.

28. An electrical power generation system for a railroad system having a rail, comprising:
   means for driving a first capacitor plate with respect to a second capacitor plate in response to a vehicle traveling on the rail;
   means for charging the first and second capacitor plates; and
   means for biasing the first and second plates apart from one another.

29. A method of generating electric power via a vehicle traveling on a rail, comprising:
   driving a first capacitor plate with respect to a second capacitor plate in response to a vehicle operating on the rail;
   charging the first and second capacitor plates; and
   biasing the first and second plates apart from one another.

30. The method of claim 29, further comprising generating power in response to a vehicle traveling on the rail.

31. The method of claim 29, further comprising exciting a piezo-electric device in response to a vehicle operating on the rail.

32. The method of claim 29, further comprising actuating a piston in a cylinder in response to a vehicle operating on the rail.

33. An electrical power generation system for a transportation system, comprising:
   a power generation device;
   a first and second electrical capacitance portions that are electrically coupled to the power generation device and that are configured to store positive and negative charge respectively; and
   a biasing device configured to separate the first and second capacitance portions with respect to one another;
   wherein the first and second electrical capacitance portions are configured to move with respect to one another in response to a vehicle operating with respect to the transportation system.

34. The electrical power generation system of claim 33, wherein the transportation system comprises a rail, the first and second electrical capacitance portions are configured to move with respect to one another in response to the vehicle operating on the rail.

* * * * *